(12) United States Patent
Schmitt

(10) Patent No.: US 6,656,085 B2
(45) Date of Patent: Dec. 2, 2003

(54) METHOD FOR CONTROLLING AN AUTOMATIC TRANSMISSION

(75) Inventor: Johannes Schmitt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/789,144

(22) Filed: Feb. 20, 2001

(65) Prior Publication Data

US 2002/0025882 A1 Feb. 28, 2002

(30) Foreign Application Priority Data

Feb. 19, 2000 (EP) .................................. 00103585

(51) Int. Cl.[7] .............................................. B60K 28/16
(52) U.S. Cl. ............................ 477/83; 180/197; 701/84
(58) Field of Search .......................... 477/70, 83, 84, 477/85, 86, 176; 180/197; 701/84, 85, 86, 87

(56) References Cited

U.S. PATENT DOCUMENTS

| 4,682,667 A | * | 7/1987 | Hosaka .................... 180/197 |
| 4,796,718 A | * | 1/1989 | Thielen et al. ............. 180/197 |
| 4,899,279 A | | 2/1990 | Cote et al. |
| 4,942,950 A | * | 7/1990 | Watanabe et al. ........... 180/197 |
| 5,265,705 A | * | 11/1993 | Takasugi et al. ............ 180/197 |
| 5,366,282 A | | 11/1994 | Schmitt et al. |
| 5,431,242 A | | 7/1995 | Iwata et al. |
| 5,499,952 A | | 3/1996 | Huber et al. |
| 5,731,976 A | * | 3/1998 | Tsuyama et al. ............ 180/197 |
| 5,742,917 A | * | 4/1998 | Matsuno .................... 180/197 |
| 5,931,762 A | * | 8/1999 | Koyama et al. ............ 477/120 |
| 6,029,511 A | * | 2/2000 | Welsch et al. ................ 701/67 |
| 6,041,276 A | * | 3/2000 | John et al. .................. 180/197 |

FOREIGN PATENT DOCUMENTS

| DE | 35 28 389 | 2/1987 |
| DE | 39 35 438 | 5/1991 |
| DE | 39 35 439 | 5/1991 |
| DE | 43 16 421 | 11/1994 |
| JP | 2-175339 | 7/1990 |

OTHER PUBLICATIONS

VonZanten et al., "FDR Die Fahrdynamik regelung von Bosch", ATZ Automobiltechnische Zeitschrift 96 (1994) pp. 674–689.*

* cited by examiner

*Primary Examiner*—Ankur Parekh
(74) *Attorney, Agent, or Firm*—Kenyon & Kenyon

(57) ABSTRACT

A method of controlling a drive train of a motor vehicle having an engine, wheels, a wheel slip control system, and an automatic transmission having a clutch, the clutch capable of being opened and closed, wherein the automatic transmission is controlled based upon signals generated by the wheel slip control system.

18 Claims, 3 Drawing Sheets

METHOD FOR CONTROLLING AN AUTOMATIC TRANSMISSION

BACKGROUND OF THE INVENTION

The present invention relates to a method for controlling the automatic transmission in a motor vehicle having an engine, wheels, a wheel slip control system and an automatic transmission having a clutch.

In a vehicle having automatic transmission, certain roadway conditions can lead to less than optimal performance of the automatic transmission during gear shifting. For one example, icy, wet, or otherwise slippery road surfaces may result in wheel slippage immediately following a gear change. When shifting up on a slippery surface, there is a danger of wheel slippage in the positive direction (drive slip). Also, when downshifting on a slippery road surface, there is a danger of wheel slippage in the negative direction (brake slip).

Another example of less than optimal performance of the automatic transmission during gear shifting occurs when starting the vehicle from rest in conditions where there is a high resistance to travel, e.g. a steep roadway inclination, deep snow, etc. When the vehicle begins to move from rest, the automatic transmission is in the start mode, and thus it allows the clutch to slip until a certain minimum vehicle speed is obtained. In situations where there is a high resistance to vehicle travel, such as when the vehicle is on an upward incline or in deep snow, the vehicle usually takes longer to reach the minimum vehicle speed leading to a heat load and faster wear of the clutch. In some circumstances it can lead to permanent damage to the clutch.

SUMMARY OF THE INVENTION in vehicles having a wheel slip control system, understood here to be a system capable of determining the friction coefficients between the wheel and the roadway surface, the slippage of the wheel, the wheel speed and the vehicle speed. Signals that are generated based upon these values can be used to improve transmission control to help eliminate the aforementioned problems. Examples of wheel slip control systems include antilock braking systems ("ABS"), traction control systems ("TCS" or "ASR"), automatic brake force differential lock systems ("ABS/ADS"), or electronic stability program ("FDR or ESP").

The present invention relates to a method of controlling a drive train of a motor vehicle having an engine, a wheel slip control system, and an automatic transmission having a clutch, characterized in that the automatic transmission is controlled based upon signals generated by the wheel slip control system.

In an exemplary embodiment of the present invention, the automatic transmission can be controlled to reduce wheel slippage on slippery road surfaces based upon signals indicating that a coefficient of friction between a wheel and a roadway surface are less than a predetermined friction coefficient value. A signal indicating the current engine speed may also be used. The automatic transmission can be controlled by controlling the closing of the clutch including controlling both when, and how quickly, the clutch is closed. For example, the clutch can be closed more slowly if the engine speed is not at or near a target engine speed for the gear being shifted into. The closer the engine speed is to the target engine speed, the more quickly the clutch can be closed without danger of wheel slippage. In another exemplary embodiment, the automatic transmission is controlled by adjusting the engine speed in addition to controlling the closing of the clutch. The engine speed can be adjusted, for example by controlling the throttle valve angle, to more closely approximate a target engine speed value.

In another exemplary embodiment, when trying to start a vehicle from rest in high resistance conditions, the automatic transmission is controlled when the vehicle speed is less than a predetermined vehicle speed and an elapsed time since vehicle start is greater than a predetermined time value. In place of comparing time, the number of slip cycles of the clutch may be compared with a corresponding predetermined value. When the wheel slip control system indicates that the vehicle speed is less than a predetermined vehicle speed value and the time since vehicle start is less than a predetermined time, the automatic control system can be controlled by increasing the engine speed and closing the clutch, thus alleviating unneeded strain on the clutch.

DETAILED DESCRIPTION

The invention is illustrated below with reference to several exemplary embodiments.

Figure 1:
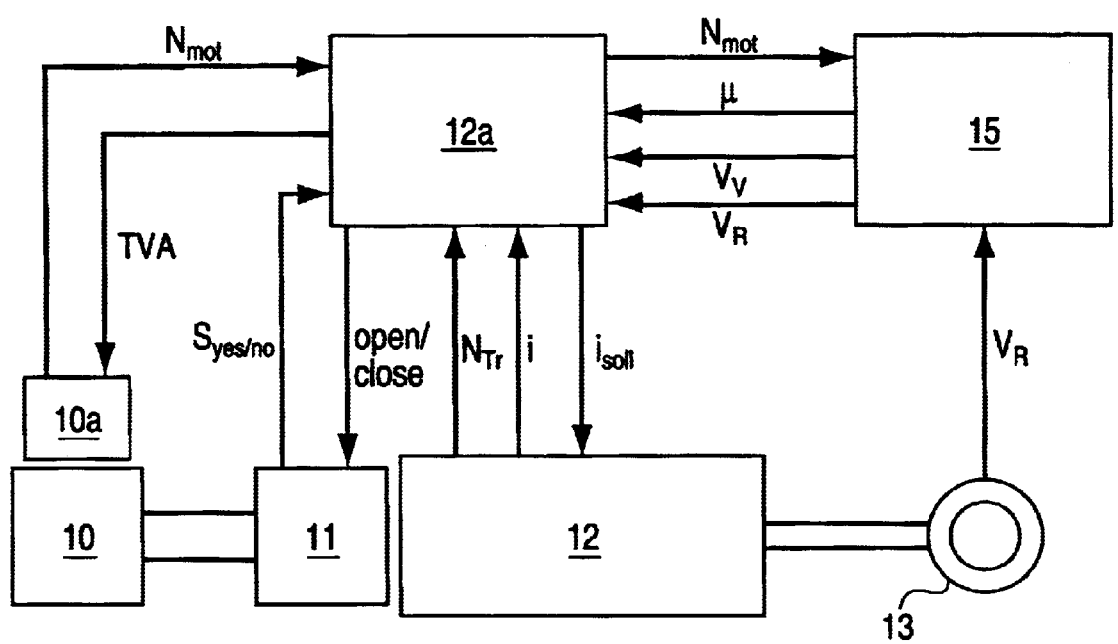
FIG. 1 is a block diagram illustrating components of an exemplary embodiment and their functions.

In FIG. 1, the relationship between the functional components of the motor vehicle are illustrated. Although an engine control 10$a$, a transmission control 12$a$, and a wheel slip control 15 are shown here as three different units for the sake of clarity, it is not intended to illustrate that the functions of transmission control 12$a$, engine control 10$a$, and wheel slip control 15 must reside in three separated hardware units. Obviously, these functions of may be performed by one or more control units. The basic components and functions illustrated in FIG. 1 are known.

A velocity $V_R$ of wheel 13 is monitored by the wheel slip control system 15, and that value is passed along to the transmission control 12$a$. A vehicle velocity $v_V$ may be calculated based in part on the velocity of one or more wheels $V_R$ or by other known methods and passed on to the transmission control 12$a$. The wheel slip control system unit 15 also determines the coefficient of friction $\mu$ between the wheel 13 and the roadway surface (not shown) and passes that value to the transmission control unit 12$a$. The transmission control unit 12$a$ also receives information about the current engine speed $N_{Mot}$ from the engine control 10$a$ (or if combined with the engine control, directly from a sensor on the engine 10). The transmission control 12$a$ can send a signal TVA to the engine control 10$a$ causing the throttle valve angle to be adjusted, and by so doing, affecting the engine speed $N_{Mot}$. The transmission control 12$a$ also receives a signal indicating the current transmission speed $M_{Tr}$ and the current gear i from the transmission 12 and sends a signal to change the gear to the desired gear $i_{soll}$ to the transmission 12. the clutch 11 sends a signal to the transmission control indicating its present status (whether or not, or to what degree it is closed $S_{yes/no}$) and receives a signal to open or to close $K_{open/close}$ (and, in some cases also how quickly to open or close). The transmission control 12a also contains a processor to process the signals and to control the transmission based on the inputs it receives. The routines used to process those signals and to control the transmission are illustrated in more detail in FIGS. 2 and 3.

Figure 2:
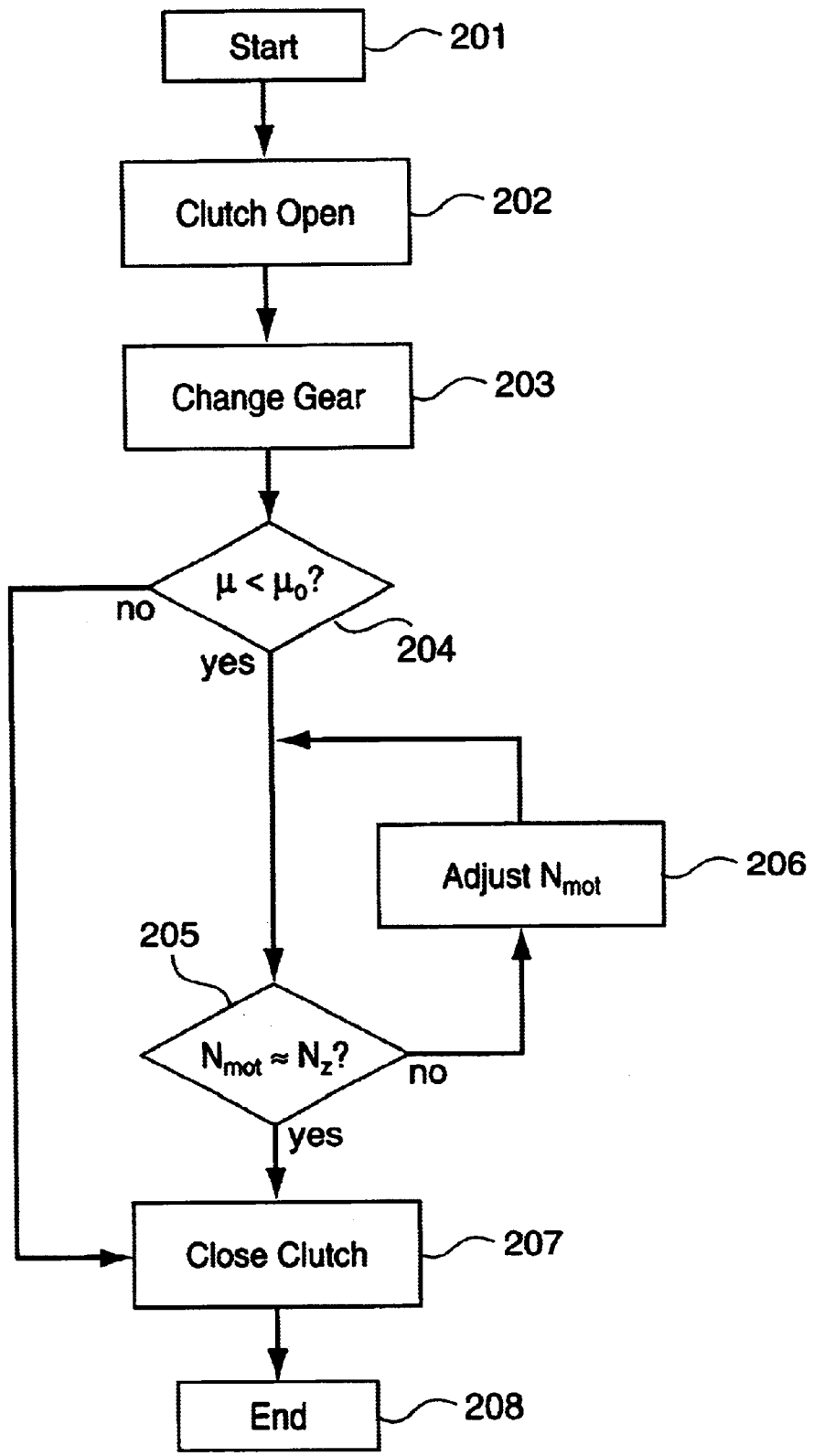
FIG. 2 is a flow chart illustrating a routine performed by the transmission control in an exemplary embodiment adapted for slippery road surface conditions.

FIG. 2 is a flow chart illustrating an exemplary routine performed by the transmission control 12a during a gear shift mode based on inputs described in FIG. 1. The routine is used to improve-the control of the transmission to reduce slippage on slippery road surfaces during gear shifting.

In the first step, the routine begins when the automatic transmission begins a gear changing procedure. In steps 202 and 203 the clutch 11 opens and a gear i is changed to the desired gear $i_{soll}$. Next, in step 204 the current coefficient of friction $\mu$ between the wheel and the roadway surface is compared to a predetermined coefficient of friction value $\mu_o$. If the coefficient of friction $\mu$ is not below the predetermined value $\mu_o$ the clutch is closed and the routine ends. If however, the coefficient of friction $\mu$ is below the predetermined value $\mu_o$ (indicating a slippery roadway surface), the current engine speed $N_{Mot}$ is then compared to a target engine speed $N_Z$ in step 205.

The target engine speed is calculated based on the current wheel speed $v_R$ and the gear i, so that the target engine speed $N_Z$, when translated by the transmission, results in a value approximately equal to the driven wheel speed. The following equation can be used:

$$N_Z = \eta * i_{soll} * (VANL + VANR/2) * c$$

where

η=efficiency, which here is approximately 0.8

VANL=left driven wheel speed

VANR=right driven wheel speed, and c=a constant, which here is approximately 0.12

If the current engine speed $N_{Mot}$ is approximately equal to the target engine speed $N_Z$ the clutch is closed and the routine ended. However, if the current engine speed $N_{Mot}$ is greater or less than the target engine speed $N_Z$ by a significant amount, for example 100 rpms, the engine speed $N_{Mot}$ is adjusted in step 205 to more closely approximate the target engine speed $N_Z$ (i.e. $N_{Mot}$ is increased if less than Nz and decreased if greater than $N_Z$).

Steps 205 and 206 are then repeated until the target engine speed $N_Z$ is approximately reached, at which time the clutch 11 is closed and the routine ended. Because the clutch 11 is only closed once the target engine speed $N_Z$ has been reached, a smoother gear shifting results. Also, there will be little if any slippage of the wheels, because, at the time that the clutch closes, the engine speed translated by the transmission approximates the wheel speed.

In an exemplary embodiment, the speed at which the clutch closes may relate to the allowable range for the engine speed $N_{Mot}$ (in comparison to the target engine speed $N_Z$). Thus, if the engine speed $N_{Mot}$ has not yet reached the target engine speed $N_Z$, but has reached an acceptably close value, the clutch may close, but do so more slowly. However, if the engine speed $N_{Mot}$ has reached a value much closer to the target engine speed $N_Z$, the clutch may close more quickly without the risk of wheel slippage. The partial engagement of the clutch during a slow closing procedure will in itself work to adjust the engine speed to more closely approximate the target engine speed $N_Z$.

Figure 3:
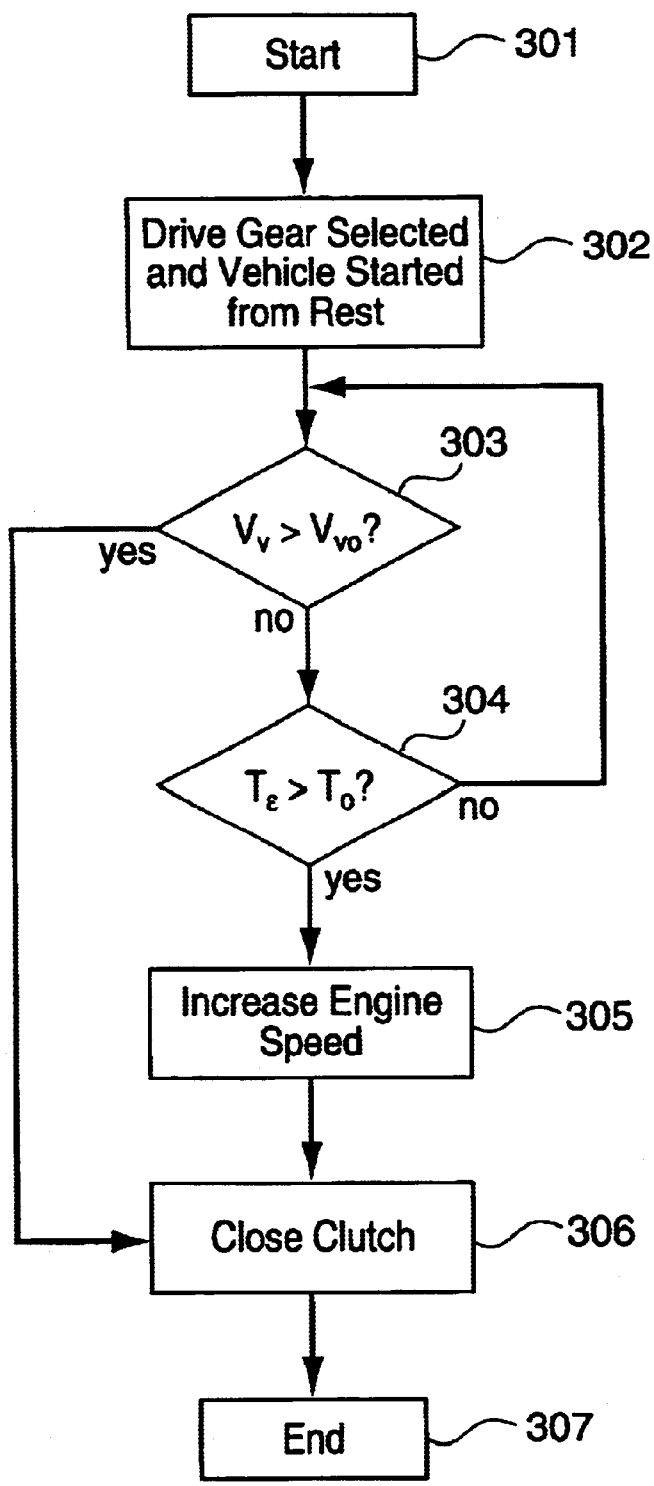
FIG. 3 is a flow chart illustrating a routine performed by the transmission control in another exemplary embodiment adapted for conditions with high resistance to vehicle start up.

FIG. 3 is a flow chart illustrating an exemplary routine performed by the transmission control 12a for an improved transmission control for vehicle starts from rest in situations in which the resistance to vehicle start is high. The routine results in a more efficient start in such situations and helps reduce heat build-up and damage to the clutch 11, in such situations.

The routine in FIG. 3 begins with step 301 when the vehicle is stopped and the selected gear is park or neutral. In step 302, the driver chooses a drive gear and begins to drive off. Next, in step 303 a current vehicle speed $v_V$ is compared to a predetermined vehicle speed value $v_{V0}$. The current vehicle speed vv can be determined by measuring a single wheel speed $v_R$, by averaging the speed of several wheels, or by other known methods. The predetermined vehicle speed value $v_{V0}$ represents the minimum vehicle speed for which the present gear can be fully engaged without putting too much resistance on the engine causing the vehicle to jerk or stall. If the vehicle has exceeded the predetermined vehicle speed $v_{V0}$, the clutch is engaged and the routine ended. If the vehicle speed $v_V$ has not reached the predetermined vehicle speed $v_{V0}$, an elapsed time since vehicle start from rest (or, an elapsed time since the start of wheel spinning) $T_E$ is compared with a predetermined time value $T_0$ in step 304. The predetermined time value $T_0$ represents the time that is normally expected for the vehicle to reach the predetermined vehicle speed $v_{V0}$. If the elapsed time $T_E$ has not yet exceeded the predetermined time value $T_0$, steps 303 and 304 are repeated. Once the predetermined time value $T_0$ is exceeded, the engine speed is increased in step 305 and the clutch is closed in step 306. By increasing the engine speed $N_{Mot}$ and closing the clutch, the heat build up and excessive wear of the clutch is avoided in situations where the resistance to vehicle travel is high.

In another exemplary embodiment, step 304 could be replaced by comparing the number of clutch slip cycles instead of measuring time. Thus, if the clutch slipped more than a predetermined number of cycles, the transmission control 12a would increase the engine speed and cause the clutch 11 to close. The step 305 could also be expanded, for example, to include the step of calculating a predetermined engine speed appropriate for the situation (given the roadway friction coefficient, the roadway inclinations, vehicle mass, etc.) and increasing the engine speed to the predetermined engine speed.

What is claimed is:

1. A method for controlling a drive train of a motor vehicle having a wheel slip control system (15), an automatic transmission (12), and a clutch (11), the clutch directly connected to the automatic transmission (12) and capable of being opened an closed, characterized in that the automatic transmission (12) is controlled by controlling the closing of the clutch and based upon a signal generated by the wheel slip control system, wherein the signal indicates at least one of the following:

a) a friction coefficient ($\mu$) between a vehicle wheel (13) and a roadway surface;

b) a current engine speed; and c) a vehicle speed.

2. The method according to claim 1 characterized in that the automatic transmission is further controlled by adjusting the engine speed ($N_{Mot}$).

3. The method according to claim 2 characterized in that the engine speed ($N_{Mot}$) is adjusted to more closely approximate a target engine speed value ($N_Z$).

4. The method according to claim 1 characterized in that the automatic transmission (12) is controlled when a vehicle speed ($N_{Mot}$) is less than a predetermined vehicle speed ($N_Z$) and an elapsed time since vehicle start ($T_E$) is greater than a predetermined time value ($T_0$).

5. The method according to claim 1 characterized in that the automatic transmission (12) is controlled when a vehicle speed ($N_{Mot}$) is less than a predetermined vehicle speed ($N_Z$) and an elapsed time since wheel spinning start ($T_E$) is greater than a predetermined time value ($T_0$).

6. The method according to claim 1 characterized in that the automatic transmission (12) is controlled when a vehicle speed ($N_{Mot}$) is less than a predetermined vehicle speed ($N_Z$) and a number of wheel spinning periods is greater than a predetermined number of wheel spinning periods.

7. The method according to claim 1 characterized in that the automatic transmission (12) is controlled when a vehicle speed ($v_V$) is less than a predetermined vehicle speed ($v_{V0}$) and a number of slip cycles of the clutch exceeds a predetermined clutch slip cycles.

8. The method according to claim 1 characterized in that the automatic transmission (12) is further controlled by increasing an engine speed ($N_{Mot}$).

9. A method for controlling a drive train of a motor including a wheel slip control system, an automatic transmission, and a clutch directly connected to the automatic transmission and configured to be opened and closed, comprising:

controlling the automatic transmission by controlling the closing of the clutch and in accordance with a signal generated by the wheel slip control system; wherein the signal indicates at least one of the following:
a) a friction coefficient between a vehicle wheel and a roadway surface;
b) a current engine speed; and
c) a vehicle speed.

10. The method according to claim 9 wherein controlling step further includes adjusting an engine speed.

11. The method according to claim 10, wherein the engine speed is adjusted in the engine speed adjusting step to more closely approximate a target engine speed value.

12. The method according to claim 9, wherein the automatic transmission is controlled in the controlling step when the vehicle speed is less than a predetermined vehicle speed value and an elapsed time since a vehicle start time is greater than a predetermined time value.

13. The method according to claim 9, wherein the automatic transmission s controlled in the controlling step when the vehicle speed is less than a predetermined vehicle speed value and an elapsed time since a wheel spinning start time is greater than a predetermined time value.

14. The method according to claim 9, wherein the automatic transmission is controlled in the controlling step when the vehicle speed is less than a predetermined vehicle speed value and a number of wheel spinning periods is greater than a predetermined number of wheel spinning periods.

15. The method according to claim 9, wherein the automatic transmission controlled in the controlling step when the vehicle speed is less than a predetermined vehicle speed value and a number of clutch slip cycles exceeds a predetermined number of clutch slip cycles.

16. The method according to claim 9, wherein the controlling step further includes increasing the engine speed.

17. The method according to claim 1, wherein the signal indicates whether the friction coefficient ($\mu$) between the vehicle wheel (13) and the roadway surface is lower than a predetermined coefficient value ($\mu_o$).

18. The method according to claim 9, wherein the signal indicates whether the friction coefficient between the vehicle wheel and the roadway surface is lower than a predetermined coefficient value.

* * * * *

UNITED STATES PATENT AND TRADEMARK OFFICE
CERTIFICATE OF CORRECTION

PATENT NO. : 6,656,085 B2
DATED : December 2, 2003
INVENTOR(S) : Johannes Schmitt It is certified that error appears in the above-identified patent and that said Letters Patent is hereby corrected as shown below:

Column 3,
Line 9, change "to improve-the control" to -- to improve the control --

Column 5,
Line 32, change "wherein controlling" to -- wherein the controlling --

Column 6,
Line 10 change "transmission s controlled" to -- transmission is controlled --
Line 19, change "transmission controlled" to -- transmission is controlled --

Signed and Sealed this

Twenty-sixth Day of April, 2005

JON W. DUDAS
*Director of the United States Patent and Trademark Office*